United States Patent
Watanabe

(10) Patent No.: US 10,717,619 B2
(45) Date of Patent: Jul. 21, 2020

(54) MEDIUM TRANSPORT APPARATUS

(71) Applicant: SEIKO EPSON CORPORATION, Tokyo (JP)

(72) Inventor: Yuta Watanabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/362,982

(22) Filed: Mar. 25, 2019

(65) Prior Publication Data

US 2019/0300316 A1    Oct. 3, 2019

(30) Foreign Application Priority Data

Mar. 28, 2018    (JP) .................................. 2018-060988

(51) Int. Cl.
   *H04N 1/04* (2006.01)
   *B65H 20/02* (2006.01)
   *H04N 1/00* (2006.01)

(52) U.S. Cl.
   CPC ......... *B65H 20/02* (2013.01); *H04N 1/00602* (2013.01); *H04N 1/00795* (2013.01); *B65H 2402/521* (2013.01)

(58) Field of Classification Search
   None
   See application file for complete search history.

(56) References Cited

U.S. PATENT DOCUMENTS

| 2011/0074087 | A1* | 3/2011 | Akimatsu | ............ | B65H 3/0684 271/3.18 |
| 2013/0241142 | A1 | 9/2013 | Hashiuchi | | |
| 2014/0092456 | A1* | 4/2014 | Ukai | .................. | H04N 1/00588 358/498 |

FOREIGN PATENT DOCUMENTS

JP    2013-193306 A    9/2013

* cited by examiner

*Primary Examiner* — Henok Shiferaw
(74) *Attorney, Agent, or Firm* — Workman Nydegger

(57) ABSTRACT

A medium transport apparatus includes a first roller configured to transport a medium, a second roller configured to transport the medium at a different position, in the transport direction of the medium, from the first roller, the second roller including a rotary shaft parallel to a rotary shaft of the first roller, and a bearing portion configured to contact with both the rotary shaft of the first roller and the rotary shaft of the second roller in an area in an extending direction of the rotary shaft, within which the transported medium passes.

9 Claims, 8 Drawing Sheets

MEDIUM TRANSPORT APPARATUS

BACKGROUND

The present disclosure relates to a medium transport apparatus.

Hitherto, various types of medium transport apparatus have been used. Among those, a medium transport apparatus including a roller for transporting a medium in a transport direction has been used.

For example, JP-A-2013-193306 discloses a transport apparatus including a transport roller for transporting a recording medium in a transport direction and a plurality of bearings for suppressing bend of a rotary shaft of the transport roller.

SUMMARY

When an apparatus in which a medium is transported by a first roller and a second roller provided at different positions in a transport direction of a medium is used as a medium transport apparatus including rollers for transporting the medium in the transport direction, the medium can be transported with high accuracy, or usable types of the medium can be increased. Thus, possibilities of the transport method for the medium can be broadened.

However, with such a configuration in which a medium is transported by the first roller and the second roller provided at different positions in the transport direction of the medium, for example, in a case where a rotary shaft of the first roller and a rotary shaft of the second roller are not parallel to each other, the transport accuracy of the medium may be degraded in some cases. Particularly, in a case where the rotary shaft of the first roller and the rotary shaft of the second roller are positioned with respect to separate frames (fixing portions), respectively, it is difficult to arrange the rotary shaft of the first roller and the rotary shaft of the second roller parallel to each other.

One advantage of certain embodiments is to improve transport accuracy of a medium with a configuration for transporting the medium by a first roller and a second roller provided at different positions in a transport direction of the medium.

According to one embodiment, a medium transport apparatus includes a first roller configured to transport a medium, a second roller configured to transport the medium at a different position, in a transport direction of the medium, from a position at which the first roller transports the medium, the second roller including a second shaft, which is serving as a rotary shaft of the second roller and is parallel to a first shaft serving as a rotary shaft of the first roller, and a bearing portion configured to contact with the first shaft and the second shaft in an area in an extending direction of the first shaft and the second shaft, within which the transported medium passes.

In the above embodiment, the medium transport apparatus includes the bearing portion configured to contact with both the rotary shaft of the first roller and the rotary shaft of the second roller, and thus with the bearing portion, an interval between the rotary shaft of the first roller and the rotary shaft of the second roller can be controlled easily and accurately. Therefore, the rotary shaft of the first roller and the rotary shaft of the second roller can easily be arranged parallel to each other, and the transport accuracy of the medium can be improved.

A medium transport apparatus according to another embodiment further includes a processing unit configured to perform, on the medium, predetermined processing at a position between the first roller and the second roller in the transport direction of the medium.

In the above embodiment, the processing unit can apply the predetermined processing on the medium transported with high transport accuracy. Thus, the desired processing can be performed with high accuracy.

In a medium transport apparatus according to another embodiment, the processing unit is a reading unit configured to read the medium.

In the above embodiment, an image or the like on the transported medium transported with high transport accuracy can be read.

In a medium transport apparatus according to another embodiment, the reading unit is a contact image sensor-type reading unit.

In a case where the distance between the reading unit and the medium being a read original is excessively large, the reading performance of the contact image sensor-type reading unit is degraded. However, in the above embodiment, the medium can be transported with high transport accuracy, and the contact image sensor-type reading unit is used in the medium transport apparatus according to this aspect. Accordingly, degradation of the reading performance, which may be caused by the use of the contact image sensor-type reading unit, can effectively be prevented.

In a medium transport apparatus according to another embodiment, a transportable amount of the medium per unit of time by the second roller is greater than a transportable amount of the medium per unit of time by the first roller.

In the above embodiment, the second roller downstream the transport direction of the medium is set to have a greater transportable amount per unit of time, and the first roller upstream in the transport direction of the medium is set to have a smaller transportable amount per unit of time. Thus, the medium can be transported in a state in which tension is applied between the first roller and the second roller, and wrinkles or the like are prevented from forming between the first roller and the second roller.

In a medium transport apparatus according to another embodiment, a wound length, which is a length of the medium wound onto a roller when the medium is transported, by the second roller is greater than the wound length by the first roller.

In the above embodiment, the length of the medium wound onto the second roller when the medium is transported is greater than the length of the medium wound onto the first roller when the medium is transported. As the length of the medium wound onto the roller becomes greater, the transport force of the medium is increased. Thus, with a simple configuration, the second roller downstream in the transport direction of the medium can be used as a main roller, and the first roller upstream in the transport direction of the medium can be used as a sub roller. As described above, using the roller downstream in the transport direction of the medium as the main roller can prevent wrinkles or the like between the first roller and the second roller from forming.

A medium transport apparatus according to another embodiment further includes a first driven roller facing the first roller such that the medium is sandwiched between the first roller and the first driven roller, and a second driven roller facing the second roller such that the medium is sandwiched between the second roller and second driven roller. In the medium transport apparatus, the second roller and the second driven roller sandwich the medium at a pressure greater than a pressure at which the first roller and the first driven roller sandwich the medium.

In the above embodiment, the pressure of the second roller and the second driven roller sandwiching the medium is greater than the pressure of the first roller and the first driven roller sandwiching the medium. With this configuration, a similar effect can be obtained as in the configuration in which the wound length of the medium onto the second roller at the time of transport of the medium is greater than the wound length of the medium onto the first roller at the time of transport of the medium. That is, wrinkles or the like can be prevented from being formed between the first roller and the second roller.

A medium transport apparatus according to another embodiment further includes a fixing portion to which the bearing portion is fixed. In the medium transport apparatus, the first shaft is positioned upstream from the second shaft in the transport direction of the medium, and the bearing portion is configured to be fixed to the fixing portion at least upstream from the first shaft in the transport direction of the medium and downstream from the second shaft in the transport direction of the medium.

In the above embodiment, the bearing portion is fixed to the fixing portion at least upstream from the rotary shaft of the first roller in the transport direction of the medium and downstream from the rotary shaft of the second roller in the transport direction of the medium. That is, the long fixing interval of the bearing portion to the fixing portion can be secured in the transport direction of the medium, and the inclination of the fixing position of the bearing portion to the fixing portion in the transport direction of the medium can be prevented. Therefore, the rotary shaft of the first roller and the rotary shaft of the second roller can be arranged in parallel to each other with high accuracy.

A medium transport apparatus according to another embodiment further includes a second bearing portion configured to contact with the first shaft and the second shaft in the area. In the medium transport apparatus, the second bearing portion is provided at a position different from a position at which the bearing portion is provided in a direction intersecting the transport direction of the medium.

In the above embodiment, the plurality of bearing portions are included in the direction intersecting the transport direction of the medium. Thus, the interval between the rotary shaft of the first roller and the rotary shaft of the second roller can be controlled at a plurality of positions, and the rotary shaft of the first roller and the rotary shaft of the second roller can be arranged in parallel to each other with high accuracy.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Hereinafter, a medium transport apparatus 1 according to an example of the invention will be described in detail with reference to the appended drawings.

Figure 1:
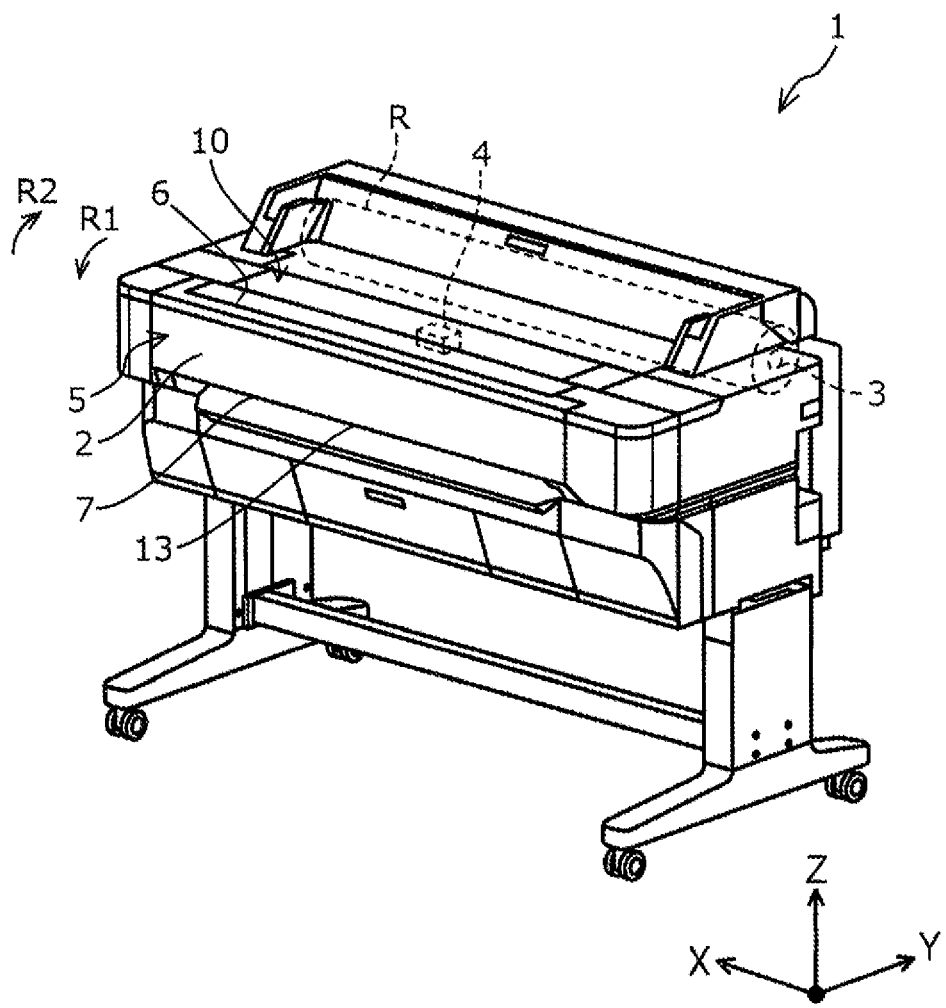
FIG. 1 is a schematic perspective view of a medium transport apparatus described in the disclosure.
Figure 2:
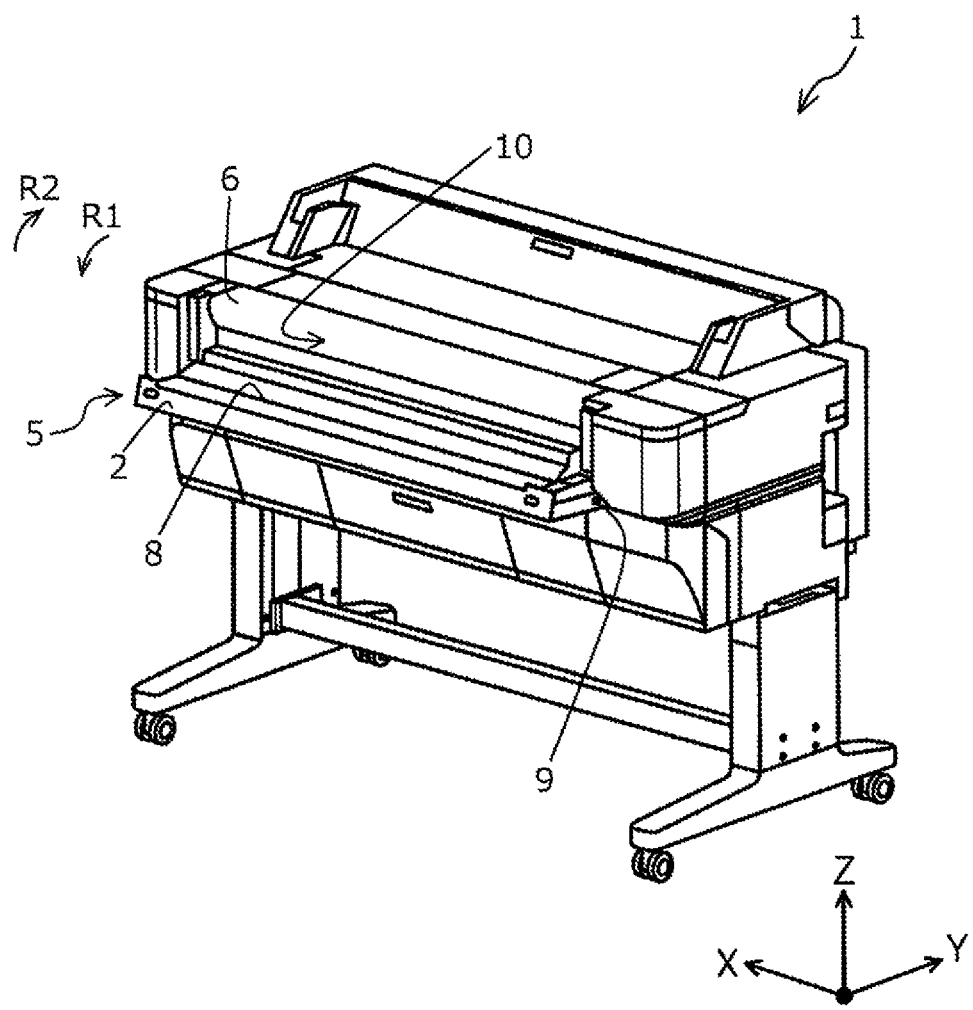
FIG. 2 is a schematic perspective view of the medium transport apparatus described in the disclosure.

First, with reference to FIG. 1 and FIG. 2, description is made of the outline of the medium transport apparatus 1 according to Example 1 of the invention.

Each of FIG. 1 and FIG. 2 is a schematic perspective view of the medium transport apparatus 1 according to this example. Especially, in FIG. 1, a state in which a cover 2 of a scanner unit 5 is closed is illustrated. In FIG. 2, a state in which the cover 2 is open is illustrated. Note that, in FIG. 1 and FIG. 2, component members are partially omitted or simplified for easy understanding of the inner structure.

As illustrated in FIG. 1, the medium transport apparatus 1 according to this example includes a set portion 3, to which a roll R being a target recording medium is set, in a main body 10, a recording head 4 configured to discharge ink onto the target recording medium to form an image, and a target recording medium delivery port 13 for delivering the target recording medium on which the image is formed by the recording head 4. Further, as illustrated in FIG. 1 and FIG. 2, the medium transport apparatus 1 according to this example includes the scanner unit 5 configured to read a medium as a read original. That is, the medium transport apparatus 1 according to this example is configured to be usable as a recording apparatus and a reading apparatus. For example, the medium transport apparatus 1 is configured such that an image read from the read original by the scanner unit 5 can be recorded on the target recording medium by the recording head 4.

The scanner unit 5 includes a supply port 6 configured to supply the medium as the read original to an inside of the scanner unit 5, the cover 2 provided with a contact image sensor-type reading unit (contact image sensor, CIS) 8, and a delivery port 7 configured to deliver the medium read by the reading unit 8. The cover 2 is configured to be movable in a first rotating direction R1 (direction of opening the cover 2) and a second rotating direction R2 (direction of closing the cover 2) with respect to a rotating shaft 9 as a reference.

Here, in the drawings, an X direction indicates a horizontal direction and a direction in which the rotating shaft 9 extends. A Y direction is the horizontal direction and a direction orthogonal to the X direction. A Z direction is a vertical direction. Further, in the following, an arrow direction indicates a positive (+) direction, and a direction opposite to the arrow direction indicates a negative (−) direction. For example, the vertically upper direction is indicated with the +Z direction, and the vertically lower direction is indicated with the −Z direction.

The medium transport apparatus 1 according to this example has a following configuration. Specifically, under the state in which the cover 2 is closed (see FIG. 1), the medium is inserted through the supply port 6, and the medium is transported to a position between the cover 2 and the main body 10. An image formed on the medium is read by the reading unit 8 provided at positions between the cover 2 and the main body 10, and the medium is delivered through the delivery port 7.

Next, description is made of the scanner unit 5 being a main part of the printing apparatus 1 according to this example.

Figure 3:
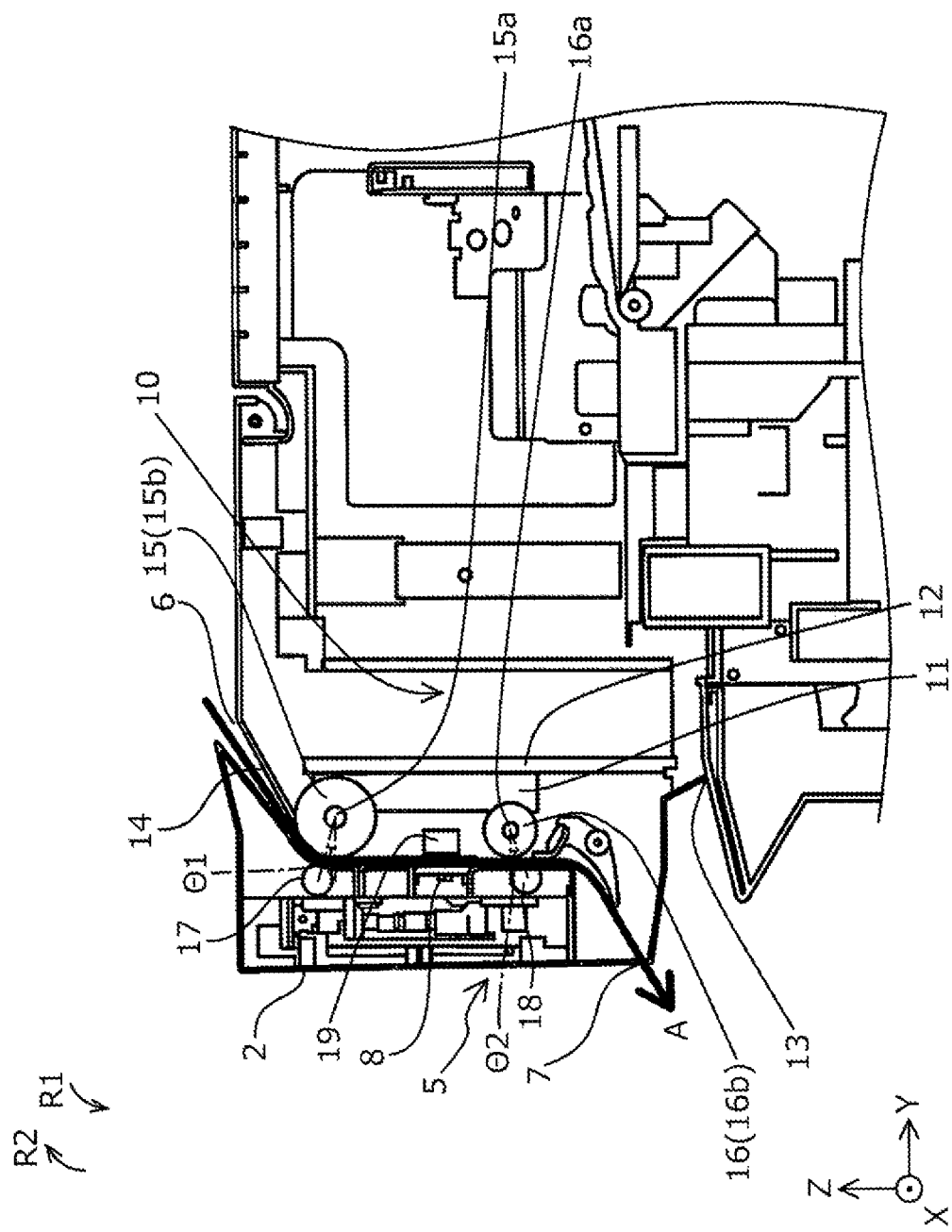
FIG. 3 is a schematic side cross-sectional view of a periphery of reading units of the medium transport apparatus described in the disclosure.
Figure 4:
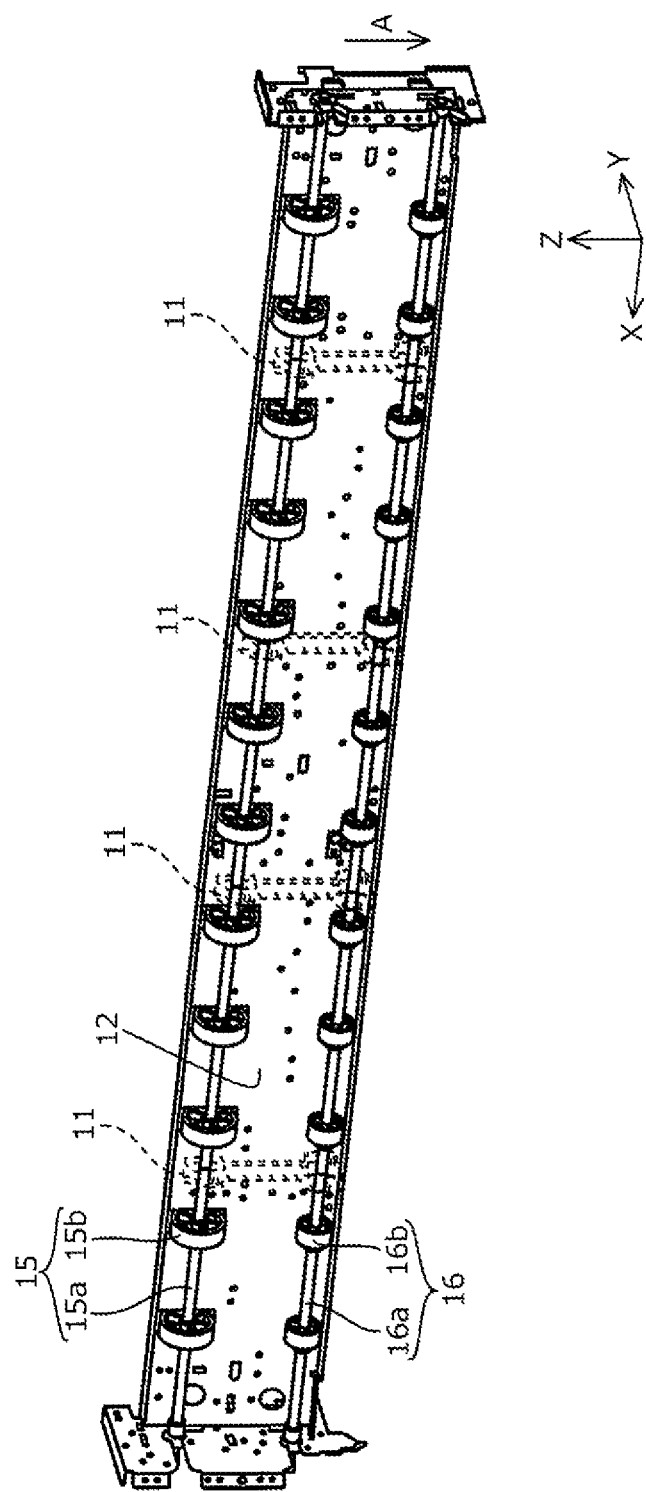
FIG. 4 is a schematic perspective view of a periphery of a region facing the reading units of the medium transport apparatus described in the disclosure.
Figure 5:
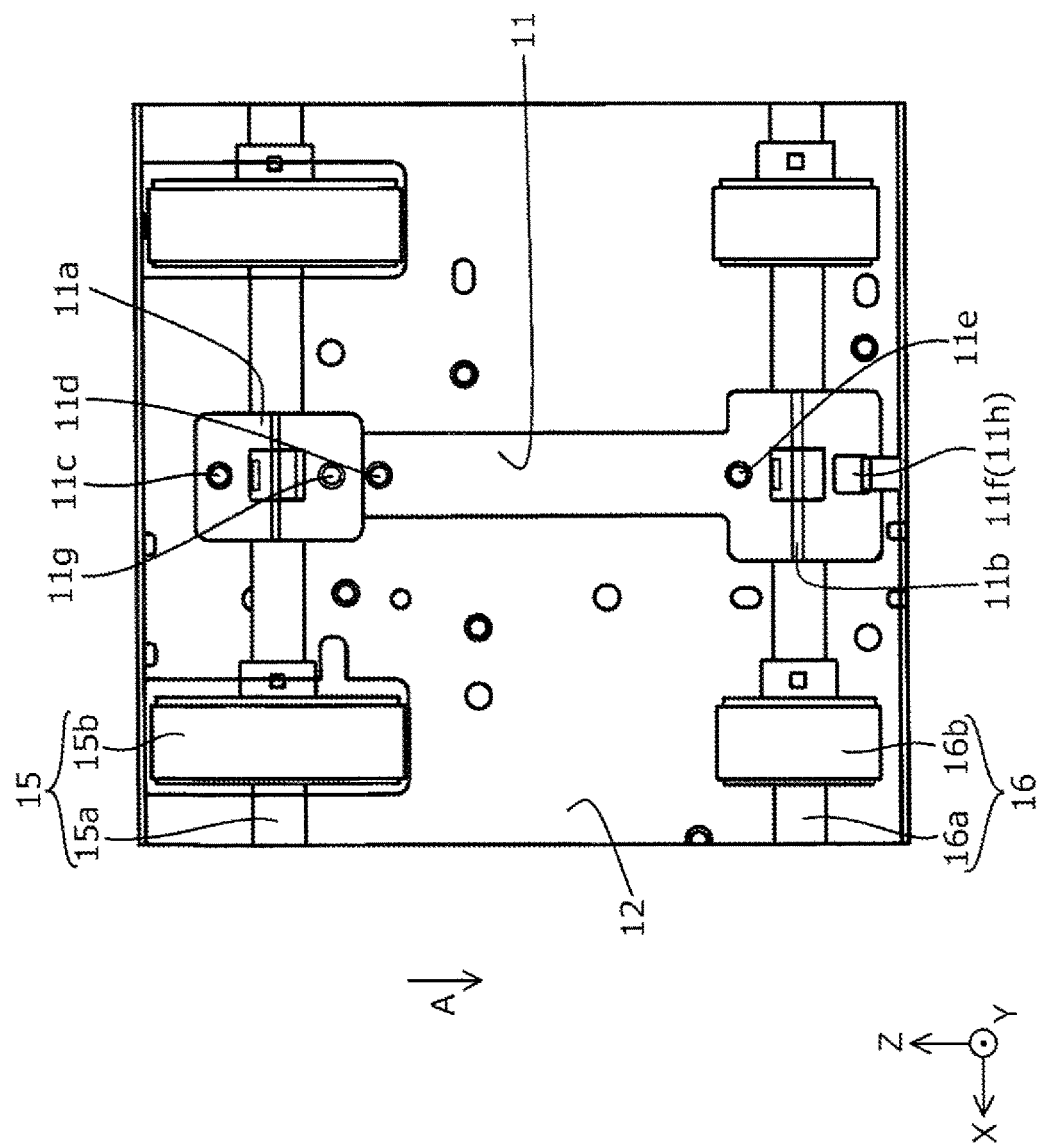
FIG. 5 is a schematic front view of bearing portions and a periphery of the bearing portions of the medium transport apparatus described in the disclosure.
Figure 6:
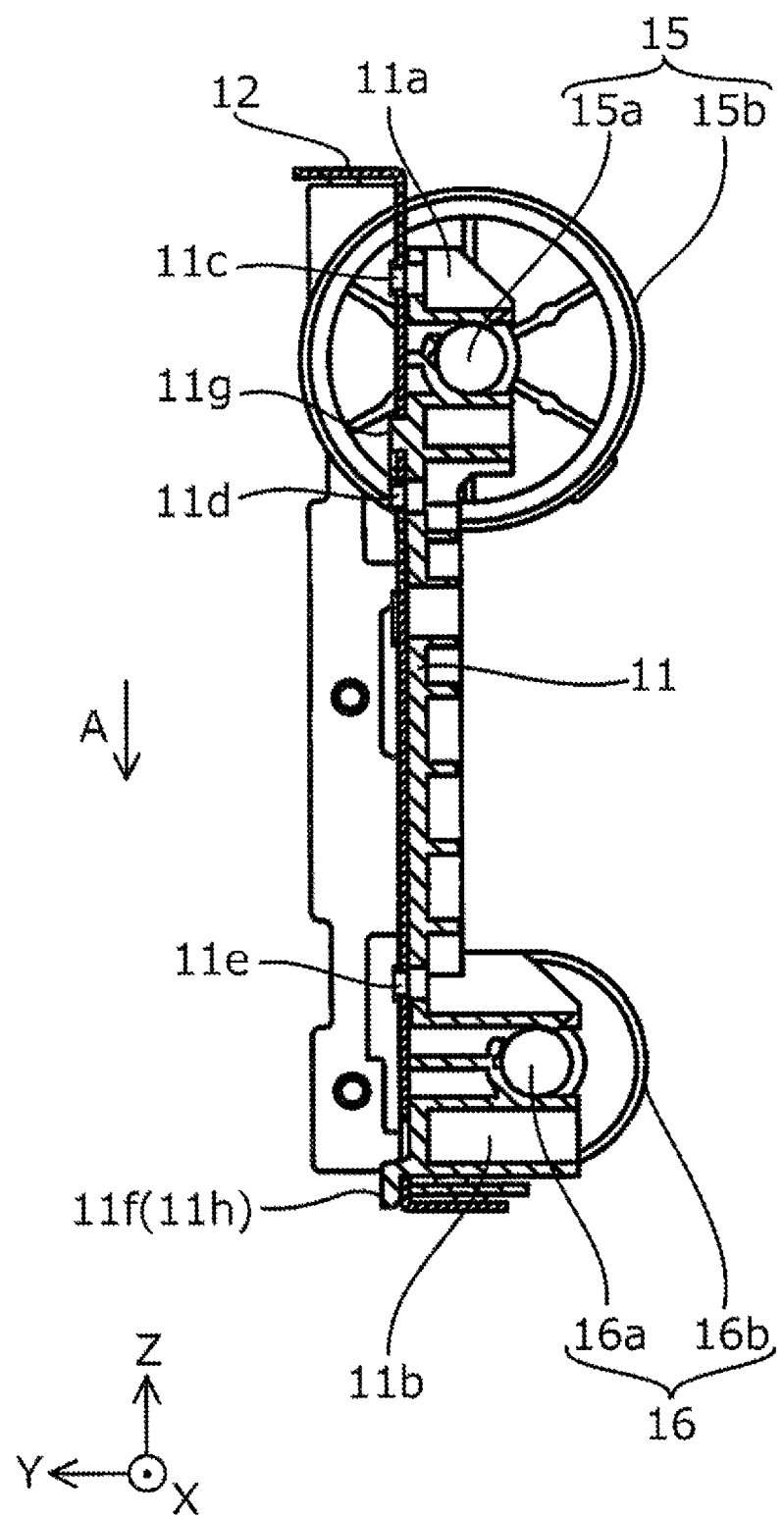
FIG. 6 is a schematic side view of the bearing portions and the periphery of the bearing portions of the medium transport apparatus described in the disclosure.
Figure 7:
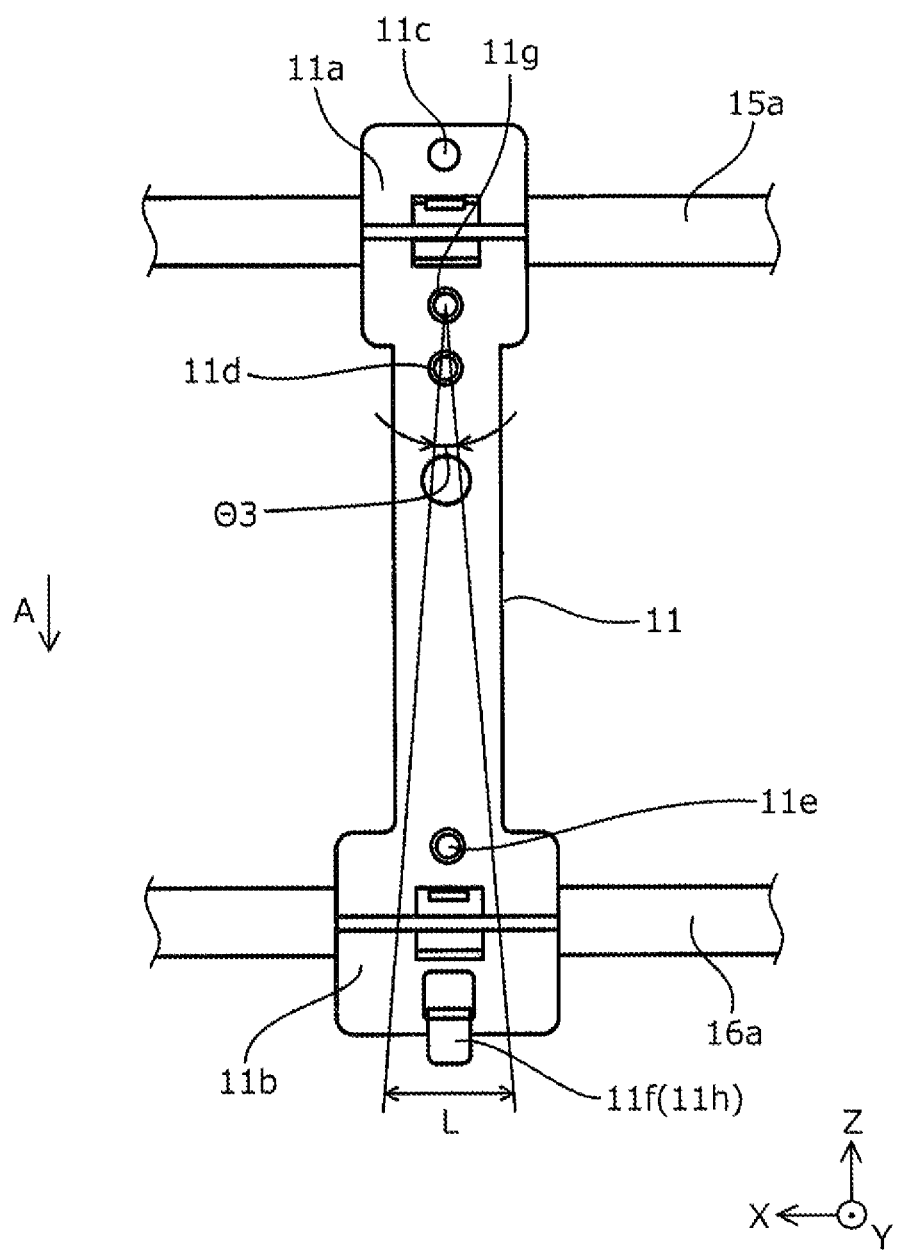
FIG. 7 is a schematic front view of the bearing portion of the medium transport apparatus described in the disclosure.
Figure 8:
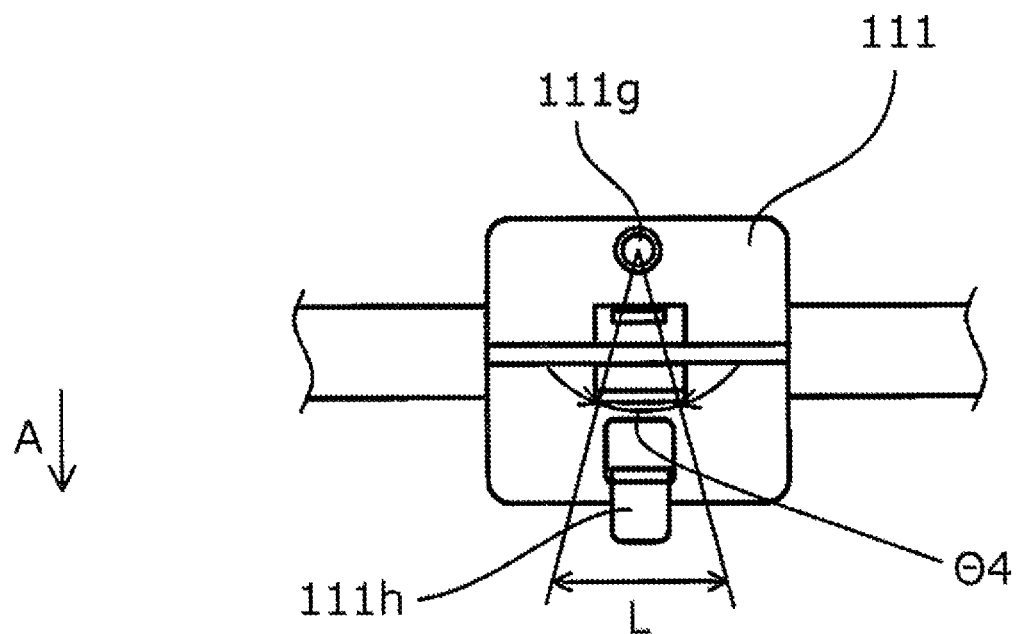
FIG. 8 is a schematic front view of a bearing portion of a medium transport apparatus described in the disclosure.
Figure 8:
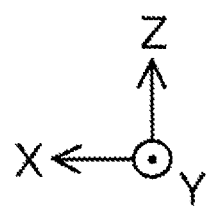

Here, FIG. 3 is a schematic side cross-sectional view of the scanner unit 5 (periphery of the reading unit 8) of the medium transport apparatus 1 according to this example. FIG. 4 is a schematic perspective view of the scanner unit 5 (periphery of a region facing the reading unit 8) of the medium transport apparatus 1 according to this example. FIG. 5 is a schematic front view of a part of the region in FIG. 4 (a bearing portion 11 and a periphery of the baring portion 11). FIG. 6 is a schematic side view of the bearing portion 11 and the periphery of the baring portion 11 of the medium transport apparatus 1 according to this example. FIG. 7 is a schematic front view of the bearing portion 11 of the medium transport apparatus 1 according to this example. FIG. 8 is a schematic front view of a bearing portion 111 of a medium transport apparatus according to a reference example.

Note that, in FIG. 3 to FIG. 6, component members are partially omitted or simplified for easy understanding of the bearing portion 11 being a main part of the medium transport apparatus 1 according to this example.

The scanner unit 5 of the medium transport apparatus 1 according to this example is configured to read the medium in a state in which the cover 2 is closed as illustrated in FIG. 3. As illustrated in FIG. 3, in the state in which the cover 2 is closed, a gap is formed between the cover 2 and the main body 10, and a transport path 14 for the medium is formed by the gap. In the transport path 14, as a transport portion for transporting the medium, a first roller 15 and a second roller 16 are formed. In the transport direction A, the first roller 15 is positioned upstream from the second roller 16 and the second roller 16 is positioned downstream from the first roller 15. Further, a first driven roller 17 is provided at a position facing the first roller 15, and a second driven roller 18 is provided at a position facing the second roller 16. The medium supplied through the supply port 6 is nipped by the first roller 15 and the first driven roller 17, and is nipped by the second roller 16 and the second driven roller 18. The nipped medium is transported in the transport direction A, and is delivered through the delivery port 7.

Note that, as illustrated in FIG. 3, the first roller 15 and the first driven roller 17 are in contact with each other upstream from a contact point between a tangential line and the first roller 15 in the transport direction A, the tangential line contacting with both the first roller 15 and the second roller 16. The second roller 16 and the second driven roller 18 are in contact with each other downstream from a contact point between the tangential line and the second roller 16 in the transport direction A. In this example, the tangential line contacting with both the first roller 15 and the second roller 16 extends in the substantially vertical direction. Thus, the center of the first driven roller is positioned on the vertically upper side of the center of the first roller 15, and the center of the second driven roller 18 is positioned on the vertically lower side of the center of the second roller 16.

Further, as illustrated in FIG. 3, in the vicinity of the middle portion of the transport path 14 in the transport direction A and on the cover 2 side in the transport path 14, the contact image sensor-type reading unit 8 is provided. Note that, the scanner unit 5 in this example has a configuration in which the reading unit 8 is formed on the cover 2 side in the transport path 14. However, the reading unit 8 may be provided on the main body 10 side in the transport path 14. Further, the reading unit 8 may be provided on both the cover 2 side and the main body 10 side. In the case where the reading units 8 are provided on both the cover 2 side and the main body 10 side, the reading unit 8 provided on the cover 2 side and the reading unit 8 provided on the main body 10 side may be provided at different positions in the transport direction A. Note that, in this example, the reading units 8 are alternately provided in plurality. In other words, the reading units 8 are provided at a plurality of different positions in the transport direction A.

Further, as illustrated in FIG. 3, a medium pressing portion 19 is formed on a side (main body 10 side) across the transport path 14, which faces the reading units 8. In a state in which the medium pressing portion 19 presses the medium, the image formed on the medium is read by the reading units 8. In this manner accuracy of reading performed by the reading units 8 is improved. Note that, in the scanner unit 5 in this example, a plurality of medium pressing portions 19 with a longitudinal direction along the X direction are alternately provided to correspond to the positions at which the reading units 8 are provided. That is, the medium pressing portions 19 are provided at a plurality of different positions in the transport direction A. As described above, in a case where the region where the medium is read by the reading units 8 is large in the transport direction A, in order to improve accuracy of reading performed by the reading unit at a upstream position and reading performed by the reading unit at a downstream position, adjustment of a transportable amount or a transport amount at the first roller 15 and the second roller 16, which is described later, is particularly effective. Note that, the invention is not particularly limited to the configuration in which the medium pressing portions 19 are alternately provided.

Further, as illustrated in FIG. 4 and the like, the first roller 15 in this example includes a plurality of roller bodies 15*b* on a rotary shaft 15*a* (first shaft) extending in the X direction. The second roller 16 in this example includes a plurality of roller bodies 16*b* on a rotary shaft 16*a* (second shaft) extending in the X direction. The roller bodies 15*b* and the roller bodies 16*b* are members that can be brought into contact with the medium. That is, in the state of being in contact with the roller bodies 15*b* and the first driven roller 17 and being in contact with the roller bodies 16*b* and the second driven roller 18, the medium is transported. Further, as illustrated in FIG. 5 to FIG. 7, the bearing portions 11 are provided. In each of the bearing portions, the rotary shaft 15*a* is received by a first bearing 11*a*, and the rotary shaft 16*a* is received by a second bearing 11*b*. As illustrated in FIG. 4, the plurality of (four in this example) bearing portions 11 are provided along the X direction. As illustrated in FIG. 5 and FIG. 7, each of the bearing portions is fixed to a frame 12 being a fixing portion provided on the main body 10 side at a first fixing position 11*c*, a second fixing position 11*d*, a third fixing position 11*e*, and a fourth fixing position 11*f*. Further, also as illustrated in FIG. 4, in the X direction, between the roller body 15*b* and the roller body 16*b*, which are at positions closest to one side (+X direction side), and the roller body 15*b* and the roller body 16*b*, which are at positions closest to the other side (−X direction side), the bearing portions 11 are provided. As described above, the roller bodies 15*b* and the roller bodies 16*b* are members that can be in contact with the medium. Thus, in the X direction, a region between the roller body 15*b* and the roller body 16b, which are at the positions closest to the one side and the roller body 15b and the roller body 16b, which are at the positions closest to the other side is a region through which the medium can pass. That is, the position at which the first bearing 11a is in contact with the rotary shaft 15a and the position at which the second bearing 11b is in contact with the rotary shaft 16a are within the region through which the medium can pass in the X direction.

Note that, each of the bearing portions 11 in this example is affixed with a screw at the first fixing position 11c, the second fixing position 11d, and the third fixing position 11e, and is regulated in movement (fixed) with an anti-rotation hook 11h at the fourth fixing position 11f. However, a method of fixing the bearing portions 11 to the frame 12 is not particularly limited. For example, fixing may be performed at two or three positions, or may be performed at five or more positions in place of at four positions. Further, the bearing portion may be affixed with screws to be fixed at all the positions, or may be fixed with anti-rotation hooks at all the positions. Further, another fixing method may be adopted.

Further, as illustrated in FIG. 5 and FIG. 7, each of the bearing portions 11 in this example includes a positioning pin 11g, and is positioned with respect to the frame 12 with the positioning pin 11g and the anti-rotation hook 11h. Further, in the state of being positioned with the positioning pin 11g and the anti-rotation hook 11h, the bearing portion is affixed with a screw at the first fixing position 11c, the second fixing position 11d, and the third fixing position 11e.

Further, as illustrated in FIG. 5 and the like, in each of the bearing portions 11 in this example, the first fixing position 11c, the position of the rotary shaft 15a, the position of the positioning pin 11g, the second fixing position 11d, the third fixing position 11e, the position of the rotary shaft 16a, and the fourth fixing position 11f (the position of the anti-rotation hook 11h) are arranged in this order in the −Z direction (from the upper side to the lower side).

In summary, the medium transport apparatus 1 according to this example includes the first roller 15 configured to transport the medium, the second roller 16 configured to transport the medium at the position downstream from the first roller 15 in the transport direction A of the medium, and includes the rotary shaft 16a parallel to the rotary shaft 15a of the first roller 15, and the bearing portion 11 in contact with both the rotary shaft 15a of the first roller 15 and the rotary shaft 16a of the second roller 16. Further, in the extending direction of the rotary shaft 15a, the bearing portion 11 is in contact with the rotary shaft 15a and the rotary shaft 16a in an area within which the transported medium passes.

In such a configuration of the medium transport apparatus 1 according to this example, the rotary shaft 15a and the rotary shaft 16a may be possibly bent in the Z direction by the action of gravity and the like. Further, the rotary shaft 15a and the rotary shaft 16a may be possibly bent in the Y direction by pressing of the first driven roller 17 and the second driven roller 18. If the rotary shaft 15a and the rotary shaft 16a bend in the X direction, the positions the roller bodies 15b and the positions of the roller bodies 16b may finely be displaced in the Y direction and the Z direction in some cases. The bearing portions 11 correct the shapes of the rotary shaft 15a and the rotary shaft 16a. Accordingly, the roller bodies 15b and the roller bodies 16b are arranged at the desired positions in the Y direction and the Z direction. As described above, the medium transport apparatus 1 according to this example includes the bearing portion 11 in contact with both the rotary shaft 15a (first shaft) of the first roller 15 and the rotary shaft 16a (second shaft) of the second roller 16. Accordingly, the bearing portion 11 easily and accurately adjusts the interval between the rotary shaft 15a of the first roller 15 and the rotary shaft 16a of the second roller 16. Therefore, in the medium transport apparatus 1 according to this example, the rotary shaft 15a of the first roller 15 and the rotary shaft 16a of the second roller 16 are easily arranged to be parallel to each other. Accordingly, the transport accuracy of the medium can be improved.

Note that, herein, the term "parallel" is not limited to indicate a state of being strictly parallel, and is used to indicate a state of being substantially parallel to such an extent that slight displacement (displacement that does not degrade the transport accuracy of the medium) is allowed.

Further, with the medium transport apparatus 1 according to this example having the above-mentioned configuration, the positions of the rotary shaft 15a of the first roller 15 and the rotary shaft 16a of the second roller 16 in a direction along a medium support direction (direction orthogonal to the transport path 14 between the first roller 15 and the second roller 16, that is, the Y direction in this example) can be determined with high accuracy by an operator. The operator positions the rotary shafts 15a and the rotary shafts 16a in the medium support direction (Y direction) at the plurality of (four in this example) positions along the X direction with high accuracy. With this, the transport amount of the medium is prevented from deviating between the ends and the center in the X direction, and wrinkles of the transported medium and the like can be prevented. Note that, the "medium support direction" indicates a direction in which the first roller 15 and the second roller 16 support the medium in the region between the first roller 15 and the second roller 16.

Further, with the medium transport apparatus 1 according to this example having the above-mentioned configuration, the positions of the rotary shaft 15a of the first roller 15 and the rotary shaft 16a of the second roller 16 in a direction along the transport direction A (Z direction in this example) can be determined with high accuracy by an operator. The rotary shafts 15a and the rotary shafts 16a are positioned with high accuracy in the transport direction A (Z direction in this example) at the plurality of (four in this example) positions along the X direction. A nipping pressure and a nipping position between the first roller 15 and the first driven roller 17 and a nipping pressure and a nipping position between the second roller 16 and the second driven roller 18 may deviate between the ends and the center in the X direction, which causes the medium to be transported in an inclined manner. However, such inclined transport and the like can be prevented.

Further, as illustrated in FIG. 3, in the medium transport apparatus 1 according to this example, the reading unit 8 is formed at a position between the first roller 15 and the second roller 16 in the transport path 14. In other words, the medium transport apparatus 1 according to this example includes the reading unit 8 being processing units, which are configured to apply, on the medium, predetermined processing, at the positions between the first roller 15 and the second roller 16 in the transport direction A of the medium. Therefore, in the medium transport apparatus 1 according to this example, the processing unit (reading unit 8) can apply the processing on the medium transported with high transport accuracy. Thus, the desired processing can be performed with high accuracy.

Here, as described above, the processing unit is the reading unit 8 configured to read the medium. Thus, the medium transport apparatus 1 according to this example can read images and the like on the medium transported with high transport accuracy.

Note that, the processing unit is not particularly limited to a specific type. In place of the reading unit used as the processing unit in this example, a recording unit configured to record images (for example, recordings head for an ink jet-type printer) and the like may be used.

Further, as described above, the reading unit 8 in this example is a contact image sensor-type reading unit.

In a case where the distance between the reading unit and the medium being a read original is excessively large, the reading performance of the contact image sensor-type reading units is degraded. Therefore, in the state in which the transport accuracy is degraded and the medium is not at the desired position, the reading performance may be possibly degraded. However, with the above-mentioned medium transport apparatus 1 according to this example, the medium can be transported with high transport accuracy. Therefore, the contact image sensor-type reading unit is used in the medium transport apparatus 1 according to this example, and thus degradation of the reading performance, which may be caused by the use of contact image sensor-type reading units, can effectively be prevented.

As illustrated in FIG. 3 and FIG. 4, the medium transport apparatus 1 according to this example includes the frame 12 as the fixing portion to which the bearing portions 11 are fixed. Further, each of the bearing portions 11 is fixed to the frame 12 at the first fixing position 11c, the second fixing position 11d, the third fixing position 11e, and the fourth fixing position 11f.

That is, each of the bearing portions 11 in this example is fixed to the frame 12 at least at the first fixing position 11c upstream from the rotary shaft 15a of the first roller 15 in the transport direction A of the medium and the fourth fixing position 11f downstream from the rotary shaft 16a of the second roller 16 in the transport direction A of the medium. That is, in the medium transport apparatus 1 according to this example, a large fixing interval between the bearing portions 11 to the frame 12 is secured in the transport direction A of the medium. The inclination of the fixing positions of the bearing portions 11 to the frame 12 in the transport direction A of the medium can be prevented. Therefore, in the medium transport apparatus 1 according to this example, the rotary shaft 15a of the first roller 15 and the rotary shaft 16a of the second roller 16 can be arranged parallel to each other with high accuracy.

The long fixing interval of the bearing portions 11 to the frame 12 is secured in the transport direction A of the medium, and thus the inclination of the fixing positions of the bearing portions 11 to the frame 12 in the transport direction A of the medium can be prevented. Now, the reason for this is described.

The bearing portions 11 and the frame 12 have manufacturing variations. Thus, fixed members such as screw holes, pin holes, engagement portions for the hooks are manufactured to be slightly larger than fixing members such as screws, pins, and hooks so as to cope with the manufacturing variations. Manufacturing the fixed members to be larger than the fixing members may cause the fixing positions of the bearing portions 11 to the frame 12 to be inclined with respect to the transport direction A of the medium. This is because the fixing members are movable with respect to the fixed members due to a difference between sizes of the fixing members and the fixed members in a direction intersecting the transport direction A.

The difference between the sizes of the fixed members and the fixing members coping with the manufacturing variations (so-called manufacturing tolerance) does not depend on the fixing interval in the transport direction A of the medium, but is constant. Thus, play of the fixing members with respect to the fixed members due to the manufacturing tolerance (movable distance L of the fixing members with respect to the fixed members in the direction intersecting the transport direction A) is also constant. As the fixing interval becomes smaller, the inclination of the fixing positions of the bearing portions 11 to the frame 12 may be increased (see an inclination angle Θ3 in FIG. 7 and an inclination angle Θ4 in FIG. 8). Therefore, the long fixing interval is secured in the transport direction A of the medium, and thus the inclination of the fixing positions of the bearing portions 11 to the frame 12 in the transport direction A of the medium can be prevented.

For example, as illustrated in FIG. 7, as compared to bearing portions 111 in a reference example illustrated in FIG. 8, in the bearing portions 11 in this example, the distance between the positioning portions is larger (distance between the positioning pin 11g and the anti-rotation hook 11h of the bearing portions 11 for this example, and distance between a positioning pin 111g to an anti-rotation hook 111h of the bearing portions 111 for the reference example). As apparent from the comparison between FIG. 7 and FIG. 8, the anti-rotation hook 11h in this example and the anti-rotation hook 111h in the reference example have the same manufacturing tolerance (movable distance L). However, the distance between the positioning portions of the bearing portions 11 in this example (distance from the positioning pin 11g to the anti-rotation hook 11h) is larger than the distance between the positioning portions of the bearing portions 111 in the reference example (distance from the positioning pin 111g and the anti-rotation hook 111h). Thus, the inclination angle Θ3 in the bearing portions 11 in this example is smaller than the inclination angle Θ4 in the bearing portions 111 in the reference example. Therefore, as compared to the bearing portions 111 in the reference example, in the bearing portions 11 in this example, the inclination of the fixing positions to the frame 12 can be prevented. As in this example, in the configuration in which the plurality of shafts (the rotary shaft 15a and the rotary shaft 16a) are in contact with the bearing portions 11, the bearing portions 11 have the distance between at least the plurality of shafts. Thus, as compared to the bearing portions 111 in the reference example, the long distance from the positioning pin 11g and the anti-rotation hook 11h can easily be secured.

Similarly to the fourth fixing position 11f, the manufacturing tolerance is also required for the first fixing position 11c, the second fixing position 11d, and the third fixing position 11e. Thus, particularly in the case where the fixing positions of the bearing portions 11 to the frame 12 are adjusted by the first fixing position 11c and the fourth fixing position 11f, the distance between which is the largest among the fixing positions, the distance from the first fixing position 11c to the fourth fixing position 11f is set to be large as much as possible. In this manner, the inclination of the fixing positions to the frame 12 can effectively be prevented.

Further, as described above, the medium transport apparatus 1 according to this example includes the plurality of (four in this example) bearing portions 11 in the direction intersecting the transport direction A of the medium (direction along the X direction). In the other word, the one of the plurality of bearing portions is provided at a position different from a position at which the other of the plurality of bearing positions is provided. Thus, in the medium transport apparatus 1 according to this example, the interval between the rotary shaft 15a of the first roller 15 and the rotary shaft 16a of the second roller 16 can be controlled at the plurality of positions. Further, the rotary shaft 15a of the first roller 15 and the rotary shaft 16a of the second roller 16 can be arranged parallel to each other with high accuracy.

Here, in the medium transport apparatus 1 according to this example, the transportable amount of the medium per unit of time by the second roller 16 is adjusted to be larger than the transportable amount of the medium per unit of time by the first roller 15. As described above, in the medium transport apparatus 1 according to this example, the second roller 16, which is downstream from the first roller 15 in the transport direction A of the medium, is set to have a larger transportable amount per unit of time. The first roller 15, which is upstream from the second roller 16 in the transport direction A of the medium, is set to have a smaller transportable amount per unit of time. Thus, in the medium transport apparatus 1 according to this example, in the state in which tension is applied between the first roller 15 and the second roller 16, the medium is transported so that wrinkles and the like are prevented from forming between the first roller 15 and the second roller 16.

Further, in a case where the rotary shaft 15a and the rotary shaft 16a are not arranged at the desired positions, there may be a case where the nipping pressure and the nipping positions between the first roller 15 and the first driven roller 17 and the nipping pressure and the nipping positions between the second roller 16 and the second driven roller 18 are not in the desired states. In such a case, the transportable amount of the medium per unit of time by the first roller 15 and the transportable amount of the medium per unit of time by the second roller 16 do not satisfy the above-mentioned relationship. Therefore, in the case where the transportable amount per unit of time of each roller is adjusted, it is particularly effective for the bearing portions 11 to be in contact with both the rotary shaft 15a and the rotary shaft 16a.

Note that, the expression "the transportable amount of the medium per unit of time by the second roller 16 is larger than the transportable amount of the medium per unit of time by the first roller 15" corresponds to, for example, a situation where the transport amount of the medium transported only by the second roller 16 is larger than the transport amount of the medium transported only by the first roller 15. In actuality, the medium is transported by both the first roller 15 and the second roller 16. Thus, the transport amount of the medium transported by the second roller 16 per unit of time and the transport amount of the medium transported by the first roller 15 per unit of time are equal to each other.

Further, in the medium transport apparatus 1 according to this example, the positions of the first roller 15 and the second roller 16 and the positions of the first driven roller 17 and the second driven roller 18 are adjusted. With this, a wound length by the second roller 16, which is a length of the medium wound onto the second roller 16 at the time the medium is transported, is greater than a wound length by the first roller 15, which is a length of the medium wound onto the first roller 15 at the time the medium is transported. In general, as the length of the medium wound onto the roller becomes greater, slippage of the medium with respect to the roller is reduced. Thus, the transport amount of the medium with respect to a unit rotation amount of the roller is increased. With this, with a simple configuration in the medium transport apparatus 1 according to this example, the second roller 16 positioned downstream from the first roller 15 in the transport direction A of the medium serves as a main roller, and the first roller 15 positioned upstream from the second roller 16 in the transport direction A of the medium serves as a sub roller. With such a configuration of the medium transport apparatus 1 according to this example, wrinkles and the like are prevented to be formed between the first roller 15 and the second roller 16.

Further, due to the rotary shaft 15a and the rotary shaft 16a being not arranged at the desired positions, the nipping pressure and the nipping positions the first roller 15 and the first driven roller 17 are varied. Accordingly, there may be a case where the wound length by the first roller 15 is different from that in a desired state. Similarly to the first roller 15, there may be a case where the wound length by the second roller 16 is different from that in a desired state. In such a case, the wound length by the first roller 15 and the wound length by the second roller 16 may possibly fail to satisfy the above-mentioned relationship. Therefore, in the case where the length of the medium wound onto each roller is adjusted, it is particularly effective for the bearing portions 11 to be in contact with both the rotary shaft 15a and the rotary shaft 16a.

Note that, the "length of the medium wound onto the roller" indicates a length of a contact surface of the roller in a circumferential direction of the roller with the medium, on which the transport force can be applied by the roller. For example, as illustrated in FIG. 3, as for the first roller 15, the "length of the medium wound onto the roller" indicates a length of the roller body 15b in the circumferential direction corresponding to an angle $\Theta 1$ formed between the direction along the medium support direction (Y direction in this example) and the direction from the center of the first roller 15 to the center of the first driven roller 17 (nipping direction). Further, as illustrated in FIG. 3, as for the second roller 16, the "length of the medium wound onto the roller" indicates a length of the roller body 16b in the circumferential direction corresponding to an angle $\Theta 2$ formed between the direction along the medium support direction (Y direction in this example) and the direction from the center of the second roller 16 to the center of the second driven roller 18 (nipping direction). In the medium transport apparatus 1 according to this example, the length of the roller body 16b in the circumferential direction corresponding to the angle $\Theta 2$ is larger than the length of the roller body 15b in the circumferential direction corresponding to the angle $\Theta 1$.

Further, in this example, the length of the medium wound onto the roller is increased to reduce the slippage of the medium with respect to the roller. However, the region (nipping width) where the medium is in contact with both the rollers forming a roller pair may be increased to reduce the slippage of the medium with respect to both the rollers. For example, in a case where the members constituting the rollers have substantially the same rigidity, the nipping width becomes larger in a case where the pressure of the roller pair sandwiching the medium is large. That is, in a case where the pressure of sandwiching the medium by the first roller 15 and the first driven roller 17 is smaller than the pressure of sandwiching the medium by the second roller 16 and the second driven roller 18, the same action and effect can be obtained as in the above-mentioned configuration in which the wound length by the second roller 16 is larger than the wound length by the first roller 15. Note that, the nipping width can be change as appropriate in accordance with the roller diameter or the rigidity of the roller surface.

Note that, the invention is not intended to be limited to the above-mentioned example, and various modifications can be achieved within the scope of the invention as described in the claims. It goes without saying that such modifications also fall within the scope of the invention.

This application claims priority under 35 U.S.C. § 119 to Japanese Patent Application No. 2018-060988, filed Mar. 28, 2018. The entire disclosure of Japanese Patent Application No. 2018-060988 is hereby incorporated herein by reference.

What is claimed is:

1. A medium transport apparatus comprising:
   a first roller configured to transport a medium;
   a second roller configured to transport the medium at a different position, in a transport direction of the medium, from a position at which the first roller transports the medium, the second roller including a second shaft, which is serving as a rotary shaft of the second roller and is parallel to a first shaft serving as a rotary shaft of the first roller;
   a bearing portion configured to contact with the first shaft and the second shaft in an area in an extending direction of the first shaft and the second shaft, within which the transported medium passes; and
   a fixing portion, to which the bearing portion is fixed.

2. The medium transport apparatus according to claim 1, comprising:
   a processing unit configured to perform, on the medium, predetermined processing at a position between the first roller and the second roller in the transport direction of the medium.

3. The medium transport apparatus according to claim 2, wherein
   the processing unit is a reading unit configured to read the medium.

4. The medium transport apparatus according to claim 3, wherein
   the reading unit is a contact image sensor-type reading unit.

5. The medium transport apparatus according to claim 1, wherein
   the first shaft is positioned upstream from the second shaft in the transport direction of the medium, and
   the bearing portion is configured to be fixed to the fixing portion at least upstream from the first shaft in the transport direction of the medium and downstream from the second shaft in the transport direction of the medium.

6. A medium transport apparatus, comprising:
   a first roller configured to transport a medium;
   a second roller configured to transport the medium at a different position, in a transport direction of the medium, from a position at which the first roller transports the medium, the second roller including a second shaft, which is serving as a rotary shaft of the second roller and is parallel to a first shaft serving as a rotary shaft of the first roller; and
   a bearing portion configured to contact with the first shaft and the second shaft in an area in an extending direction of the first shaft and the second shaft, within which the transported medium passes,
   wherein a transportable amount of the medium per unit of time by the second roller is greater than a transportable amount of the medium per unit of time by the first roller.

7. The medium transport apparatus according to claim 6, wherein
   a wound length, which is a length of the medium wound onto a roller when the medium is transported, by the second roller is greater than the wound length by the first roller.

8. The medium transport apparatus according to claim 6, comprising:
   a first driven roller facing the first roller such that the medium is sandwiched between the first roller and the first driven roller; and
   a second driven roller facing the second roller such that the medium is sandwiched between the second roller and the second driven roller, wherein
   the second roller and the second driven roller sandwich the medium at a pressure greater than a pressure at which the first roller and the first driven roller sandwich the medium.

9. A medium transport apparatus, comprising
   a first roller configured to transport a medium;
   a second roller configured to transport the medium at a different position, in a transport direction of the medium, from a position at which the first roller transports the medium, the second roller including a second shaft, which is serving as a rotary shaft of the second roller and is parallel to a first shaft serving as a rotary shaft of the first roller;
   a bearing portion configured to contact with the first shaft and the second shaft in an area in an extending direction of the first shaft and the second shaft, within which the transported medium passes; and
   a second bearing portion configured to contact with the first shaft and the second shaft in the area, wherein
   the second bearing portion is provided at a position different from a position at which the bearing portion is provided in a direction intersecting the transport direction of the medium.

* * * * *